(12) United States Patent
Shiepe et al.

(10) Patent No.: US 6,471,850 B2
(45) Date of Patent: Oct. 29, 2002

(54) LOW GRAVITY ELECTROCHEMICAL CELL

(75) Inventors: Jason K. Shiepe, Middletown, CT (US); Trent M. Molter, Glastonbury, CT (US)

(73) Assignee: Proton Energy Systems, Inc., Rocky Hill, CT (US)

( * ) Notice: Subject to any disclaimer, the term of this patent is extended or adjusted under 35 U.S.C. 154(b) by 0 days.

(21) Appl. No.: 09/736,964

(22) Filed: Dec. 14, 2000

(65) Prior Publication Data

US 2002/0000385 A1 Jan. 3, 2002

Related U.S. Application Data

(60) Provisional application No. 60/171,122, filed on Dec. 16, 1999.

(51) Int. Cl.⁷ .................................................. C25C 1/02
(52) U.S. Cl. ................. 205/628; 205/629; 205/633; 205/634; 205/637; 204/252; 204/253; 204/255; 204/256; 204/257; 204/258; 204/263; 429/13; 429/17; 429/30; 429/34; 429/38; 429/39
(58) Field of Search .................... 204/263, 252, 204/253, 255, 256, 257, 258; 205/628, 629, 633, 634, 637; 429/30, 34, 38, 39, 13, 17

(56) References Cited

U.S. PATENT DOCUMENTS

| | | | |
|---|---|---|---|
| 3,957,535 A | 5/1976 | Asher | 136/86 |
| 3,992,271 A | 11/1976 | Danzig et al. | 204/129 |
| 4,039,409 A | 8/1977 | LaConti et al. | 204/129 |
| 4,209,591 A | 6/1980 | Hendriks | 435/288 |
| 4,457,824 A | 7/1984 | Dempsey et al. | 204/290 F |
| 4,707,229 A | 11/1987 | Dempsey et al. | 204/129 |
| 4,729,932 A | 3/1988 | McElroy | 429/34 |
| 5,064,732 A | 11/1991 | Meyer | 429/13 |
| 5,296,109 A | 3/1994 | Carlson et al. | 204/129 |
| 5,316,643 A * | 5/1994 | Ahn et al. | 204/265 |
| 5,372,689 A | 12/1994 | Carlson et al. | 204/252 |
| 5,470,448 A | 11/1995 | Molter et al. | 204/252 |

OTHER PUBLICATIONS

A. Leonida, Proceedings of the European Space Power Conference, Hydrogen/Oxygen SPER Electrochemical Devices for Zero–G Applications, esa SP–294, vol. 1, Aug. 1989. esa SP–294, vol. 1, Aug. 1989.

J. McElroy, Journal of Power Sources, 29 (1990) pp. 399–412, Hydrogen–Oxygen Proton–Exchange Membrane Fuel Cells and Electrolyzers. No Month Available.

* cited by examiner

*Primary Examiner*—Bruce F. Bell
(74) *Attorney, Agent, or Firm*—Cantor Colburn LLP

(57) ABSTRACT

An electrochemical cell system includes a hydrogen electrode; an oxygen electrode; a membrane disposed between the hydrogen electrode and the oxygen electrode; and a compartmentalized storage tank. The compartmentalized storage tank has a first fluid storage section and a second fluid storage section separated by a movable divider. The compartmentalized storage tank is in fluid communication with the electrochemical cell. Further, an electrochemical cell includes a hydrogen electrode; an oxygen electrode; an electrolyte membrane disposed between and in intimate contact with the hydrogen electrode and said oxygen electrode; an oxygen flow field disposed adjacent to and in intimate contact with the oxygen electrode; a hydrogen flow field disposed adjacent to and in intimate contact with the hydrogen electrode; a water flow field disposed in fluid communication with the oxygen flow field; and a media divider disposed between the oxygen flow field and the water flow field.

33 Claims, 2 Drawing Sheets

LOW GRAVITY ELECTROCHEMICAL CELL

CROSS-REFERENCE TO RELATED APPLICATIONS

This application claims the benefit of the Provisional Application Ser. No. 60/171,122 filed Dec. 16, 1999, which is hereby incorporated by reference.

TECHNICAL FIELD

The present invention relates to an electrochemical cell system, and especially relates to the use of an electrochemical cell system capable of operating in a low gravity environment.

BRIEF DESCRIPTION OF THE RELATED ART

Electrochemical cells are energy conversion devices, usually classified as either electrolysis cells or fuel cells. An electrolysis cell functions as a hydrogen generator by electrolytically decomposing water to produce hydrogen and oxygen gases, and functions as a fuel cell by electrochemically reacting hydrogen with oxygen to generate electricity.

Referring to FIG. 1, a partial section of a typical proton exchange membrane fuel cell 10 is detailed. In fuel cell 10, hydrogen gas 12 and reactant water 14 are introduced to a hydrogen electrode (anode) 16, while oxygen gas 18 is introduced to an oxygen electrode (cathode) 20. The hydrogen gas 12 for fuel cell operation can originate from a pure hydrogen source, methanol or other hydrogen source. Hydrogen gas electrochemically reacts at anode 16 to produce hydrogen ions (protons) and electrons, wherein the electrons flow of from anode 16 through an electrically connected external load 21, and the protons migrate through a membrane 22 to cathode 20. At cathode 20, the protons and electrons react with the oxygen gas to form resultant water 14', which additionally includes any reactant water 14 dragged through membrane 22 to cathode 20. The electrical potential across anode 16 and cathode 20 can be exploited to power an external load.

The same configuration as is depicted in FIG. 1 for a fuel cell is conventionally employed for electrolysis cells. In a typical anode feed water electrolysis cell (not shown), process water is fed into a cell on the side of the oxygen electrode (in an electrolytic cell, the anode) to form oxygen gas, electrons, and protons. The electrolytic reaction is facilitated by the positive terminal of a power source electrically connected to the anode and the negative terminal of the power source connected to a hydrogen electrode (in an electrolytic cell, the cathode). The oxygen gas and a portion of the process water exit the cell, while protons and water migrate across the proton exchange membrane to the cathode where hydrogen gas is formed. In a cathode feed electrolysis cell (not shown), process water is fed on the hydrogen electrode, and a portion of the water migrates from the cathode across the membrane to the anode where protons and oxygen gas are formed. A portion of the process water exits the cell at the cathode side without passing through the membrane. The protons migrate across the membrane to the cathode where hydrogen gas is formed.

The typical electrochemical cell includes a one or more individual cells arranged in a stack, with the working fluid directed through the cells via input and output conduits formed within the stack structure. The cells within the stack are sequentially arranged, each including a cathode, a proton exchange membrane, and an anode. In certain conventional arrangements, the anode, cathode, or both are gas diffusion electrodes that facilitate gas diffusion to the membrane. Each cathode/membrane/anode assembly (hereinafter "membrane electrode assembly", or "MEA") is typically supported on both sides by flow fields comprising screen packs or bipolar plates. Such flow fields facilitate fluid movement and membrane hydration and provide mechanical support for the MEA. Since a differential pressure often exists in the cells, compression pads or other compression means are often employed to maintain uniform compression in the cell active area, i.e., the electrodes, thereby maintaining intimate contact between flow fields and cell electrodes over long time periods.

In certain arrangements, the electrochemical cells can be employed to both convert electricity into hydrogen, and hydrogen back into electricity as needed. Such systems are commonly referred to as regenerative fuel cell systems.

Electrochemical cell systems are generally operated within a gravitational field. Gravity aids in pulling water away from the electrode surface when the electrochemical cell is used in fuel cell mode, whereas in the electrolysis mode, gas and water exit the cell stack together thereby necessitating gravity-induced phase separation.

It is sometimes desirable to operate electrochemical cell systems in a low gravity environment, or even in a zero gravity environment. However, in typical configurations, water may collect on an electrode thereby inhibiting oxygen access to the electrode, in the fuel cell mode, and alternative water/gas separation methods would be needed in the electrolysis cell mode. Solutions addressing each of these requirements would necessitate excess equipment costs, add to system complexity, and consume electricity.

While existing electrochemical cell systems are suitable for their intended purposes, there still remains a need for improvements, particularly regarding operation of electrochemical cell systems in low gravity or zero gravity environments.

SUMMARY OF THE INVENTION

The above-described drawbacks and disadvantages are alleviated by an electrochemical cell comprising a hydrogen electrode; an oxygen electrode; a membrane disposed between the hydrogen electrode and the oxygen electrode; and a compartmentalized storage tank having a first fluid storage section and a second fluid storage section separated by a movable divider, wherein the compartmentalized storage tank is in fluid communication with the electrochemical cell.

The present invention further relates to an electrochemical cell including a hydrogen electrode; an oxygen electrode; an electrolyte membrane disposed between and in intimate contact with the hydrogen electrode and the oxygen electrode; an oxygen flow field disposed adjacent to and in intimate contact with the oxygen electrode; a hydrogen flow field disposed adjacent to and in intimate contact with the hydrogen electrode; a water flow field disposed in fluid communication with the oxygen flow field; and a media divider disposed between the oxygen flow field and the water flow field.

The above discussed and other features and advantages of the present invention will be appreciated and understood by those skilled in the art from the following detailed description and drawings.

BRIEF DESCRIPTION OF THE DRAWINGS

Referring now to the drawings, which are meant to be exemplary and not limiting, and wherein like elements are numbered alike in the several Figures.

DETAILED DESCRIPTION OF THE PREFERRED EMBODIMENTS

The present invention relates to an electrochemical cell and an electrochemical cell system. The system has one or more electrochemical cells and a compartmentalized storage tank that enable the system to be used in a low or zero gravity environment. Upon application of a load or electricity to the system, the system operates statically, eliminating the need for both external pumps and the external electrical supply needed for the operation of those pumps. As used herein, "low gravity" means a gravity less than that of the surface gravity of the earth, i.e., less than about 9.78 m/s$^2$ (meters per squared), and preferably from about zero to about 9.5 m/s$^2$, more preferably from about 0.1 to about 9.0 m/s$^2$. Of course, it is to be understood that while useful in low gravity environments, the system may also be used at normal gravity.

It should be noted that although the present invention will be described in relation to a proton exchange membrane electrochemical cell employing hydrogen, oxygen, and water, it is readily understood that this invention can be employed with all types of electrochemical cells. Additionally, all types of electrolytes may be used, including, but not limited to the following: phosphoric acid, solid oxide, and potassium hydroxide, and the like. Various reactants can also be used, including, but not limited to, the following: hydrogen bromine, oxygen, air, chlorine, and iodine. Upon the application of different reactants and/or different electrolytes, the flows and reactions are understood to change accordingly, as is commonly understood in relation to that particular type of electrochemical cell.

Figure 2:
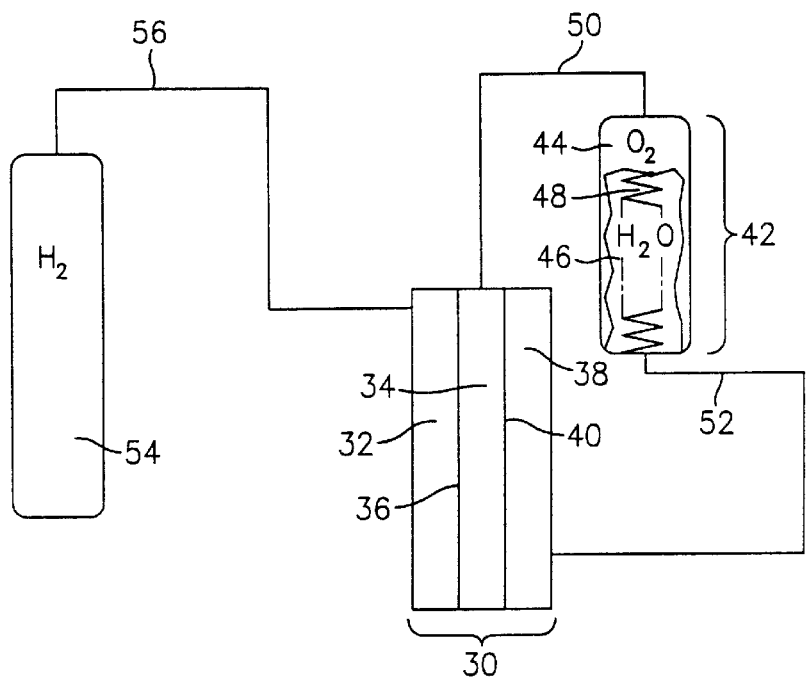
FIG. 2 is a schematic diagram of one embodiment of a low gravity electrochemical cell system.

Referring to FIG. 2, an electrochemical cell 30 comprises a hydrogen flow field 32, an oxygen flow field 34, an MEA 36 disposed therebetween, a water flow field 38, and an electrically conductive porous media divider 40. A compartmentalized storage tank 42 encloses an oxygen storage section 44 and a water storage section 46, which are separated by a movable divider 48. The oxygen storage section 44 is connected to the oxygen flow field 34 via line 50, the water storage section 46 is connected to the water flow field 38 via line 52, and a hydrogen storage tank 54 is connected to the hydrogen flow field 32 via line 56.

Storage tank 54 and compartmentalized storage tank 42 can be made out of any conventional material that can withstand the required pressures and the exposure to reactants, and preferably comprise a sufficient capacity to hold the desired amount of fluids for the given application. Lines 50, 52, and 56 can also be any material that can withstand the required pressures and the exposure to reactants. The movable divider 48, which separates the oxygen storage section 44, i.e., one fluid section, from the water storage section 46, i.e., another fluid section, comprises any material that is compatible with the stored gas and in any shape that allows the volume of the oxygen storage section 44 to change inversely with the volume of the water storage section 46, while effectively preventing the mixing of the two stored fluids. Possible compartmentalized storage tanks 42 include bladder tanks, bellows tanks, piston tanks, and diaphragm tanks, among others, with a stainless steel vessel having an elastomeric bladder typically preferred for low or zero gravity applications.

During operation in electrolyzer mode, stored water is converted to hydrogen gas and oxygen gas. The hydrogen produced hereby can be stored as high pressure gas, or alternatively, in a solid form, such as a metal hydride, a carbon based storage (e.g. particulates, nanofibers, nanotubes, or the like), or others, and combinations comprising at least one of the foregoing storage mediums.

As oxygen gas is produced, it passes through line 50 to oxygen storage section 44, increasing the pressure of the oxygen therein and placing pressure on the movable divider 48. The pressure on the movable divider 48 increases the pressure of the water storage section 46, and forces the water through line 52 to the water flow field 38 of electrochemical cell 30.

In all cases, however, the oxygen pressure is greater than the water pressure, with the difference between the oxygen pressure and the water pressure being below the bubble pressure of the porous media divider 40. In fuel cell mode the operation of the movable divider 48 reverses as stored oxygen converts into water and the pressure in the oxygen storage section 44 decreases. In this mode the water generated by the reaction flows back to the water storage section 46.

Although FIG. 2 shows oxygen as the stored gas on the gas side of the movable divider 48, hydrogen may also be used, and/or oxygen and hydrogen may also be used simultaneously if two tanks, each with a movable divider, are employed. In another configuration, the gas storage section of a single compartmentalized storage tank may be further subdivided into two separate storage sections for oxygen and hydrogen in order to gain the cumulative effect of the pressure of both gases on the movable divider.

Figure 3:
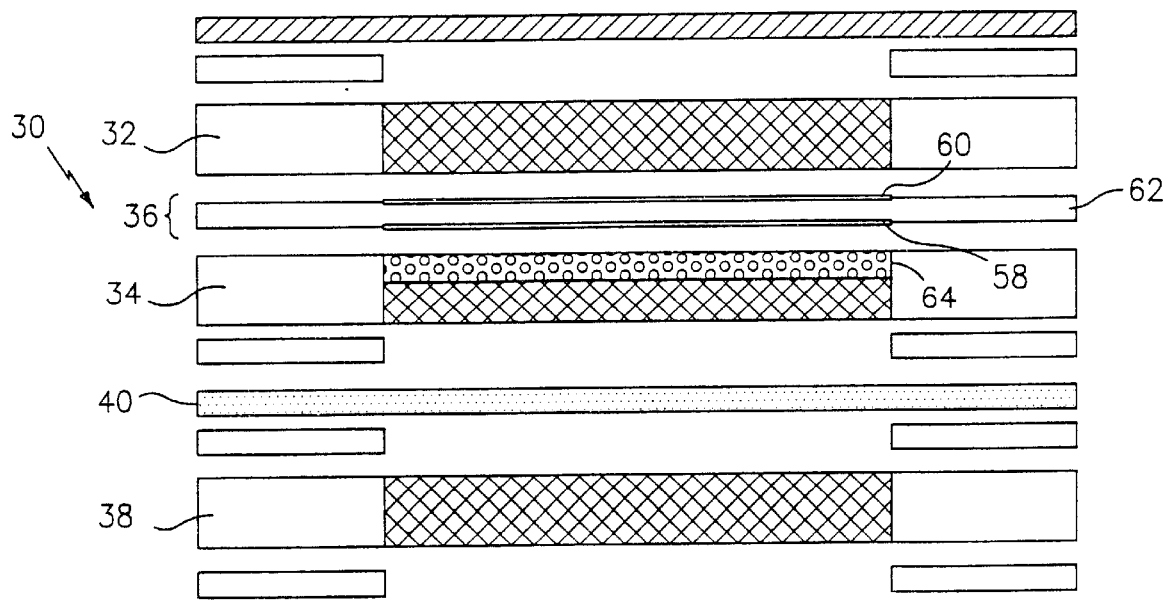
FIG. 3 is an expanded cross-sectional view of one embodiment of a low gravity electrochemical cell.

Turning now to FIG. 3, which illustrates an electrochemical cell 30 with more detail, the MEA 36 comprises an oxygen electrode 58, a hydrogen electrode 60, and a proton exchange membrane (electrolyte) 62 disposed therebetween.

The membrane 62 can be of any material typically employed for forming the membrane in electrochemical cells. The electrolytes are preferably solids or gels under the operating conditions of the electrochemical cell. Typically, the thickness of the membrane 62 is up to about 0.05 inches (1.27 millimeters, "mm"), with about 0.001 (0.0254 mm) to about 0.015 inches (0.381 mm) preferred. Useful materials include proton conducting ionomers and ion exchange resins. Proton conducting ionomers comprise complexes of an alkali metal, alkali earth metal salt, or a protonic acid with one or more polar polymers such as a polyether, polyester, or polyimide, or complexes of an alkali metal, alkali earth metal salt, or a protonic acid with a network or crosslinked polymer containing the above polar polymer as a segment. Useful polyethers include polyoxyalkylenes, such as polyethylene glycol, polyethylene glycol monoether, polyethylene glycol diether, polypropylene glycol, polypropylene glycol monoether, and polypropylene glycol diether, and the like; copolymers of at least one of these polyethers, such as poly(oxyethylene-co-oxypropylene) glycol, poly (oxyethylene-co-oxypropylene) glycol monoether, and poly (oxyethylene-co-oxypropylene) glycol diether, and the like; condensation products of ethylenediamine with the above polyoxyalkylenes; esters, such as phosphoric acid esters, aliphatic carboxylic acid esters or aromatic carboxylic acid esters of the above polyoxyalkylenes. Copolymers of, e.g., polyethylene glycol with dialkylsiloxanes, polyethylene glycol with maleic anhydride, or polyethylene glycol monoethyl ether with methacrylic acid are known in the art to exhibit sufficient ionic conductivity to be useful. Useful complex-forming reagents can include alkali metal salts, alkali metal earth salts, and protonic acids and protonic acid salts. Counterions useful in the above salts can be halogen ion, perchloric ion, thiocyanate ion, trifluoromethane sulfonic ion, borofluoric ion, and the like. Representative examples of such salts include, but are not limited to, lithium fluoride, sodium iodide, lithium iodide, lithium perchlorate, sodium thiocyanate, lithium trifluoromethane sulfonate, lithium borofluoride, lithium hexafluorophosphate, phosphoric acid, sulfuric acid, trifluoromethane sulfonic acid, tetrafluoroethylene sulfonic acid, hexafluorobutane sulfonic acid, and the like.

Ion-exchange resins useful as proton conducting materials include hydrocarbon- and fluorocarbon-type resins. Hydrocarbon-type ion-exchange resins can include phenolic or sulfonic acid-type resins; condensation resins such as phenol-formaldehyde, polystyrene, styrene-divinyl benzene copolymers, styrene-butadiene copolymers, styrene-divinylbenzene-vinylchloride terpolymers, and the like, that are imbued with cation-exchange ability by sulfonation, or are imbued with anion-exchange ability by chloromethylation followed by conversion to the corresponding quaternary amine.

Fluorocarbon-type ion-exchange resins can include hydrates of a tetrafluoroethylene-perfluorosulfonyl ethoxyvinyl ether or tetrafluoroethylene-hydroxylated (perfluoro vinyl ether) copolymers. When oxidation and/or acid resistance is desirable, for instance, at the cathode of a fuel cell, fluorocarbon-type resins having sulfonic, carboxylic and/or phosphoric acid functionality are preferred. Fluorocarbon-type resins typically exhibit excellent resistance to oxidation by halogen, strong acids, and bases. One family of fluorocarbon-type resins having sulfonic acid group functionality is the NAFION® resins (DuPont Chemicals, Wilmington, Del.).

The electrodes 58, 60 can be conventional electrodes composed of materials such as platinum, palladium, rhodium, iridium, ruthenium, osmium, carbon, gold, tantalum, tin, indium, nickel, tungsten, manganese, and the like, as well as mixtures, oxides, alloys, and combinations comprising at least one of the foregoing materials. Additional possible catalysts, which can be used alone or in combination with the above, include graphite and organometallics, such as pthalocyanines and porphyrins, and combinations thereof, and the like. Some possible catalysts are disclosed in U.S. Pat. Nos. 3,992,271, 4,039,409, 4,209,591, 4,707,229, and 4,457,824, which are incorporated herein by reference. This catalyst can comprise discrete catalyst particles, hydrated ionomer solids, fluorocarbon, other binder materials, other materials conventionally utilized with electrochemical cell catalysts, and combinations comprising at least one of the foregoing. Useful ionomer solids can be any swollen (i.e. partially disassociated polymeric material) proton and water conducting material. Possible ionomer solids include those having a hydrocarbon backbone, and perfluoroionomers, such as perfluorosulfonate ionomers (which have a fluorocarbon backbone). Ionomer solids and catalysts therewith are further described in U.S. Pat. No. 5,470,448 to Molter et al., which is incorporated herein by reference.

In order to allow transport of the electrons, the electrodes electrically connect to an electrical load and/or power source. The electrical connection can comprise any conventional electrical connector such as wires, a truss/bus rod, bus bars, combinations thereof, or another electrical connector.

The oxygen flow field 34 and the hydrogen flow field 32 are located on either side of the MEA 36, and typically comprise material that is porous and also electrically conductive. The porous, electrically conductive material is capable of providing structural integrity for supporting the membrane assembly, allowing passage of system fluids to and from the appropriate electrodes 58 or 60, and conducting electrical current to and from the appropriate electrodes 58 or 60.

The oxygen flow field 34 preferably comprises a porous material 64 that is disposed adjacent to and in intimate contact with the MEA 36. This porous material 64 enables dual-directional flow of gas and water, promoting water flow to and from the membrane by acting as a wick to remove liquid water from the MEA 36, and serves as an electrode support. Preferably, a flow field member (e.g., one or more screen layers, bipolar plates, or other type of support structures) is disposed adjacent to and in intimate contact with the porous material 64 at a surface of porous material 64 that is opposite the electrode 58.

The water flow field 38, which is disposed adjacent to and in electrical contact with the electrically conductive porous media divider 40, can comprise a similar or different porous conductive material as the other flow fields 32, 34. The material used in the water flow field 38 should allow the flow of water to and from the porous media divider 40.

The flow fields 32, 34, 38 may each comprise support structures such as screen packs, bipolar plates with grooves or other flow features formed therein, other type of support structure, or combinations of at least one of the foregoing support structures. Suitable screen packs comprise electrically conductive material, such as woven metal, expanded metal, perforated or porous plates, fabrics (woven and non-woven), ceramic (e.g., particulate filled ceramic), polymers or other material, or a combination thereof, which provide structural integrity to the membrane assembly while forming an appropriate flow field for the various fluids and establishing an electron transport to and from the electrodes. Typically the screen packs are composed of material such as niobium, zirconium, tantalum, titanium, steels such as stainless steel, nickel, and cobalt, among others, as well as mixtures, oxides, and alloys comprising at least one of the foregoing materials. The geometry of the openings in the screens can range from ovals, circles, and hexagons to diamonds and other elongated and multi-sided shapes. The particular porous conductive material employed is dependent upon the particular operating conditions on that side of the membrane assembly. Examples of suitable screen packs are disclosed in commonly assigned U.S. application Ser. No. 09/464,143, and U.S. patent Ser. No. 09/102,305, which are both incorporated herein by reference in their entireties. The size and geometry of the flow fields 32, 34, 38 should be sufficient to enable the desired fluid control. Typically, the thickness is up to about 10 inches (254 mm), with about 0.001 (0.0254 mm) to about 0.1 (2.54 mm) inches preferred.

The porous media divider 40 is typically disposed between and in electrical contact with the oxygen flow field 34 and the water flow field 38. The porous media divider 40 can be any material that provides a barrier to oxygen passage and enables the flow of water between the oxygen flow field 34 and the water flow field 38, while also allowing electron flow to and from the electrodes 58, 60, as described further herein.

In an alternative embodiment, the media divider 40 can be disposed in electrical contact with the hydrogen flow field 32. In this embodiment, water is either produced on the hydrogen electrode and moved through the media divider 40 to the compartmentalized tank 42, or from the compartmentalized tank 42 to the hydrogen electrode 60, through the membrane 62, to the oxygen electrode 58 where it reacts to form oxygen and hydrogen ions.

The porous media divider 40 can comprise any electrically conductive material compatible with the electrochemical cell environment (for example, the desired pressure differential, preferably up to or exceeding about 4,000 psi, temperatures up to about 250° C., and exposure to hydrogen, oxygen, and water). Some possible materials include carbon, nickel and nickel alloys (e.g., Hastelloy®, which is commercially available from Haynes International, Kokomo, Ind., and Inconel®, which is commercially available from INCO Alloys International Inc., Huntington, W. Va., among others), cobalt and cobalt alloys (e.g., MP35N®, which is commercially available from Maryland Specialty Wire, Inc., Rye, N.Y., Haynes 25, which is commercially available from Haynes International, and Elgiloy®, which is commercially available from Elgiloy® Limited Partnership, Elgin, Ill., among others), titanium, zirconium, niobium, tungsten, carbon, hafnium, iron and iron alloys (e.g., steels such as stainless steel and the like), among others, and oxides, mixtures, and alloys comprising at least one of the foregoing materials.

The particular form of the porous media divider 40 includes forms such as fibrous (random, woven, non-woven, chopped, continuous, and the like), granular, particulate powder, preform, and the combinations comprising at least one or more of the foregoing forms. The size and geometry of the media divider 40 should be sufficient to enable the desired movement of water while inhibiting the flow of oxygen therethrough (or other appropriate fluid control). Typically, the thickness is up to about 0.5 inches (12.7 mm), with about 0.001 inches (0.0254 mm) to about 0.3 inches (7.62 mm) preferred, about 0.001 inches (0.0254 mm) to about 0.05 (1.27) inches more preferred, and about 0.001 inches (0.0254 mm) to about 0.03 inches (0.762 mm) most preferred. Furthermore, to attain the desired flow through the media divider 40, the bubble pressure should be greater than about 0.01 pounds per square inch (psi), with about 7.0 to about 8.0 psi preferred.

Prior to operation as a fuel cell, the stored gas in the compartmentalized storage tank is preferably at a pressure greater than that of the stored water (e.g., up to about 1 psi greater, with about 0.3 psi to about 0.5 psi greater typically sufficient, with a pressure differential up to the bubble pressure of media divider 40 possible). This pressure differential causes the movable divider 48 to be initially biased toward the water storage section 46 of the compartmentalized storage tank 42, forcing water toward the water flow field 38. For example, a mechanical, hydraulic or similar force bias can be employed in the storage tank 42 to push the bellows open, with the bias preferably set at a pressure below the bubble pressure of media divider 40.

Figure 1:
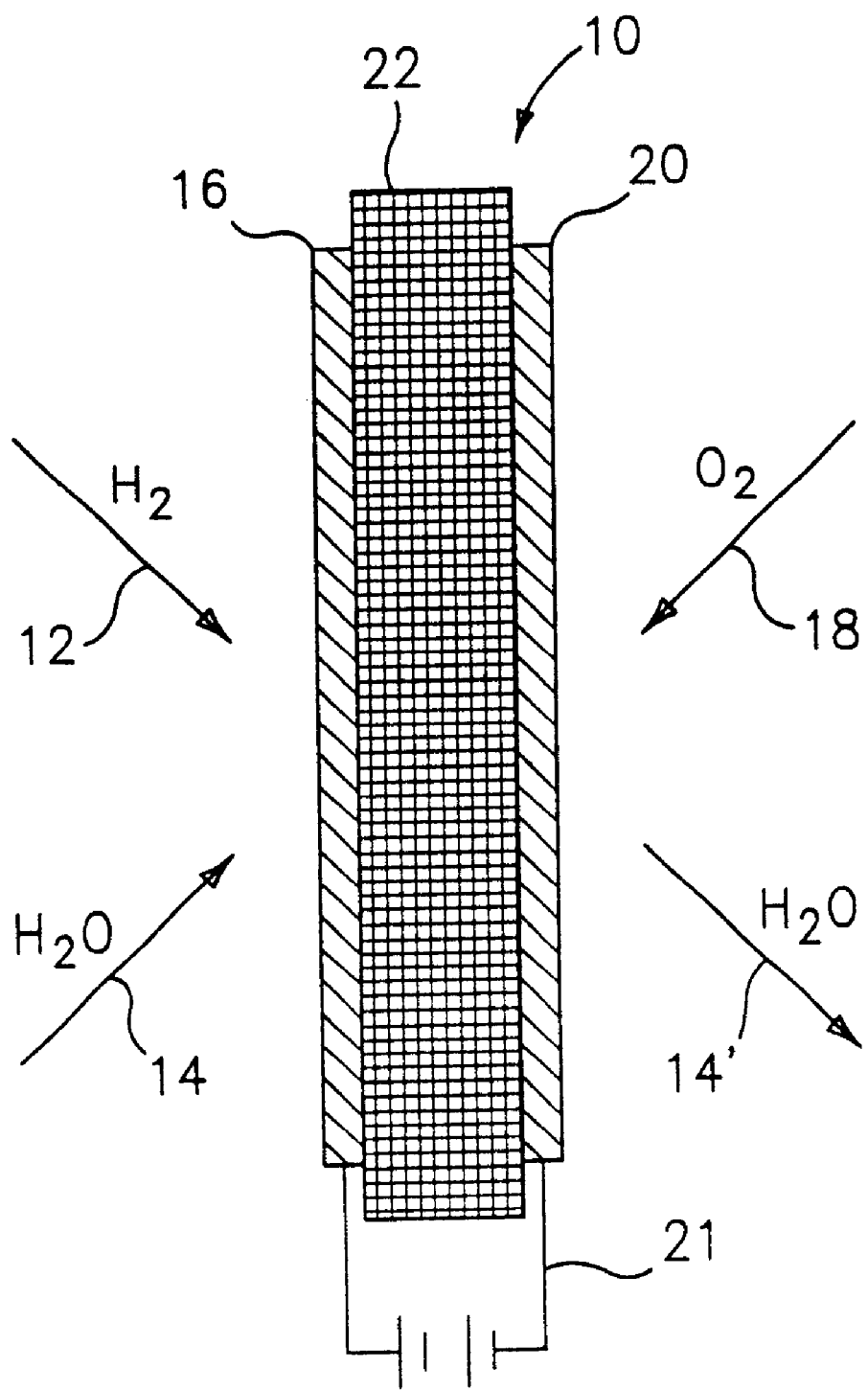
FIG. 1 is a schematic diagram of a prior art electrochemical cell showing an electrochemical reaction.

In order to utilize the electrochemical cell 30, it is preferably initially charged by an external power source (not shown). During charging, the cell 30 is operating as an electrolyzer, and water (or other liquid reactant such as hydrogen, bromine) is separated, e.g. into hydrogen and oxygen. The hydrogen and oxygen are stored in their respective areas within the system (e.g., hydrogen in storage tank 54 and oxygen in oxygen storage section 44), and, after reaching operating pressure, the system can be used as a fuel cell to produce electricity. That is, the external power source can be disconnected and an electrical load can be attached (e.g., as in load 21 depicted in FIG. 1) to the charged system. The cell 30 can then operate as a fuel cell, recombining the hydrogen and oxygen into water, while producing an electrical current. When no more current is produced, the system is regenerated by again charging with an external power source such as a photovoltaic cell or other power source.

The stored oxygen from the oxygen storage section 44 and hydrogen from the hydrogen storage tank 54 move to the respective active areas of the electrochemical cell 30. The hydrogen gas flows through the hydrogen flow field 32 and dissociates into hydrogen ions and free electrons at the hydrogen electrode 60. The hydrogen ions move across the proton exchange membrane 62 to the oxygen flow field 34 while the electrons travel through an external load to the oxygen electrode 58. At the oxygen electrode 58, the hydrogen ions combine with oxygen and electrons to form water. The newly formed water moves through the oxygen flow field 34 and is wicked away by the porous media divider 40 to the water flow field 38. From the water flow field 38, the water is piped into the water storage section 46 of the compartmentalized storage tank 42, and the movable divider 48 shifts toward the gas storage side 44 to accommodate the increased water volume.

When the pressure of the stored gases falls below the level needed to operate the fuel cell 30, an external power supply can be attached to the system. The cell 30 is then operated in reverse, as an electrolyzer, and the stored water, which is biased to a pressure below that of the oxygen gas, is fed into the water flow field 38. The porous media divider 40 wicks the water from the water flow field to the oxygen flow field 34. Not intending to be limited by theory, it is believed that the water, in the form of water vapor, moves through the oxygen flow field 34 to the oxygen electrode 58 where it forms oxygen gas, hydrogen ions, and electrons. Again, the hydrogen ions pass through the membrane 62 and the electrons move through the external load, to the hydrogen electrode 60, where they combine to form hydrogen.

EXAMPLE

An electrochemical cell having the configuration of cell 30 in FIG. 3 was constructed and tested. The cell had an active area of 0.05 squared feet (46.4 squared centimeters), and was fluidly coupled with a 316 stainless steel water tank having a volumetric capacity of 50 cubed centimeters (cc), a 316 stainless steel hydrogen tank having a volumetric capacity of 500 cc, and a 316 stainless steel oxygen tank having a volumetric capacity of 500 cc. A single cell was constructed using NAFION® membrane, titanium alloy screen packs for the hydrogen flow field, oxygen flow field, and water flow field, and a titanium alloy porous plate for the media divider. The system was operated under zero gravity conditions at 119° F. (48.3° C.), with fluid flows equivalent to pressures of 40 psi and 50 psi for the hydrogen and oxygen, respectively. The following tables summarize polarization data for the above-described cell, wherein Table 1 represents electrolysis data and Table 2 represents fuel cell data.

TABLE 1

Electrolysis

| Current (Amperes) | Current Density (Amperes per Squared Feet) | Voltage (Volts) |
|---|---|---|
| 0 | 0 | 1.3 |
| 5.3 | 15 | 1.48 |

TABLE 1-continued

Electrolysis

| Current (Amperes) | Current Density (Amperes per Squared Feet) | Voltage (Volts) |
|---|---|---|
| 7.1 | 142 | 1.66 |
| 10.2 | 204 | 1.76 |
| 15.8 | 316 | 1.9 |
| 24.7 | 494 | 2.17 |

TABLE 2

Fuel Cell

| Current (Amperes) | Current Density (Amperes per Squared Feet) | Voltage (Volts) |
|---|---|---|
| 0 | 0 | 1.006 |
| 0.51 | 10.2 | 0.888 |
| 1 | 20 | 0.831 |
| 1.25 | 25 | 0.805 |
| 1.51 | 30.2 | 0.78 |
| 1.99 | 39.8 | 0.737 |
| 2.25 | 45 | 0.718 |
| 3 | 60 | 0.672 |
| 3.7 | 74 | 0.612 |
| 5.4 | 108 | 0.543 |

The electrochemical cell 30 can be operated in low gravity or even zero gravity environments, such as extraterrestrial environments, without the need for an external electrical supply that would be required in a conventional system to power pumps, fans, and other supporting equipment. Cell 30 is effective with or without the compartmentalized storage tank. The electrochemical cell system may be charged in electrolyzer mode by photovoltaic cells attached to the outside of an orbiting space station, for example, and used as a fuel cell to provide electricity thereafter. Since the system is regenerative and does not require the use of pumps, it can serve as a stand-alone system for electrical needs. Additionally, the electrochemical cell system has increased reliability relative to conventional systems because it has fewer moving components. The present invention can operate in both low gravity and zero gravity environments, as the need arises. Finally, since the present invention uses fewer parts and integrates others, it is more compact than conventional electrochemical cell systems.

While preferred embodiments have been shown and described, various modifications and substitutions may be made thereto without departing from the spirit and scope of the invention. Accordingly, it is to be understood that the present invention has been described by way of illustrations and not limitation.

What is claimed is:

1. An electrochemical cell system, comprising:
    at least one electrochemical cell having a hydrogen electrode and an oxygen electrode with an electrolyte membrane disposed therebetween and in intimate contact therewith; and
    a compartmentalized storage tank having a first fluid storage section and a second fluid storage section separated by a movable divider, wherein said compartmentalized storage tank is in fluid communication with said electrochemical cell.

2. An electrochemical cell system as in claim 1, wherein said electrochemical cell further comprises a hydrogen flow field disposed adjacent to and in fluid communication with said hydrogen electrode, an oxygen flow field disposed adjacent to and in fluid communication with said oxygen electrode, and a media divider disposed adjacent to and in fluid and electrical communication with said oxygen flow field.

3. An electrochemical cell system as in claim 2, wherein said media divider is selected from the group of materials consisting carbon, nickel, cobalt, titanium, zirconium, niobium, tungsten, carbon, hafnium, iron, and oxides, mixtures, and alloys comprising at least one of the foregoing materials.

4. An electrochemical cell system as in claim 2, wherein said media divider is up to about 0.5 inches thick.

5. An electrochemical cell system as in claim 2, wherein said media divider is about 0.001 inches to about 0.3 inches thick.

6. An electrochemical cell system as in claim 2, wherein said media divider is about 0.001 inches to about 0.05 inches thick.

7. An electrochemical cell system as in claim 2, wherein said media divider is about 0.001 inches to about 0.03 inches thick.

8. An electrochemical cell system as in claim 2, wherein said media divider has a bubble pressure greater than about 0.01 psi.

9. An electrochemical cell system as in claim 8, wherein said media divider has a bubble pressure of about 7.0 psi to about 8.0 psi.

10. An electrochemical cell system as in claim 8, further comprising a mechanical force bias capable of maintaining a gas/liquid pressure differential of up to said bubble pressure.

11. An electrochemical cell system as in claim 2, wherein said movable divider is a bladder, a bellows, a piston, or a diaphragm.

12. An electrochemical cell system as in claim 2, wherein said gas storage section is in fluid communication with said oxygen flow field.

13. An electrochemical cell system as in claim 2, wherein said gas storage section is in fluid communication with said hydrogen flow field.

14. An electrochemical cell system as in claim 1, wherein said electrochemical cell further comprises a hydrogen flow field disposed adjacent to and in fluid communication with said hydrogen electrode, an oxygen flow field disposed adjacent to and in fluid communication with said oxygen electrode, and a media divider disposed adjacent to and fluid and electrical communication with said hydrogen flow field.

15. An electrochemical cell system as in claim 14, wherein said media divider is selected from the group of materials consisting carbon, nickel, cobalt, titanium, zirconium, niobium, tungsten, carbon, hafnium, iron, and oxides, mixtures, and alloys comprising at least one of the foregoing materials.

16. An electrochemical cell system as in claim 14, wherein said media divider is up to about 0.5 inches thick.

17. An electrochemical cell system as in claim 14, wherein said media divider is about 0.001 to about 0.3 inches thick.

18. An electrochemical cell system as in claim 14, wherein said media divider has a bubble pressure greater than about 0.01 psi.

19. An electrochemical cell system as in claim 18, further comprising a mechanical force bias capable of maintaining a gas/liquid pressure differential of up to said bubble pressure.

20. An electrochemical cell system as in claim 14, wherein said media divider has a bubble pressure of about 7.0 psi to about 8.0 psi.

21. An electrochemical cell system as in claim 14, wherein said movable divider is a bladder, bellows, piston, or diaphragm.

22. An electrochemical cell system as in claim 14, wherein said gas storage section is in fluid communication with said oxygen flow field.

23. An electrochemical cell system as in claim 14, wherein said gas storage section is in fluid communication with said hydrogen flow field.

24. A method for operating an electrochemical cell system, comprising:
   introducing water to an oxygen electrode;
   electrolyzing said water to form oxygen, hydrogen ions and electrons, wherein said hydrogen ions migrate through a membrane to a hydrogen electrode;
   directing said oxygen to an oxygen storage section of a compartmentalized storage tank, wherein said oxygen increases the pressure in said storage tank and moves a movable divider which forces said water to move from said compartmentalized storage tank to said oxygen electrode;
   moving said electrons to said hydrogen electrode; and
   reacting said hydrogen ions and said electrons to form hydrogen.

25. A method for operating an electrochemical cell system as in claim 24, further comprising passing said water from said compartmentalized storage tank to a water flow field, through a media divider and an oxygen flow field to said oxygen electrode.

26. A method for operating an electrochemical cell system as in claim 25, wherein said media divider is porous, electrically conductive, and has a bubble pressure greater than about 0.01 psi.

27. A method for operating an electrochemical cell system as in claim 26, further comprising maintaining a gas/liquid pressure differential of up to said bubble pressure.

28. A method for operating an electrochemical cell system as in claim 24, wherein said movable divider is a bladder, bellows, piston, or diaphragm.

29. A method for operating an electrochemical cell system, comprising:
   introducing oxygen to an oxygen electrode;
   introducing hydrogen to a hydrogen electrode;
   ionizing said hydrogen to produce hydrogen ions and electrons, wherein said hydrogen ions migrate across a membrane to said oxygen electrode while said electrons pass through an electrical connection to said oxygen electrode;
   combining said oxygen, hydrogen ions and electrons to form water; and
   directing said water to a water storage section of a compartmentalized storage tank, wherein said water increases the pressure in said storage tank, moving a movable divider, and forcing said oxygen to move from said compartmentalized storage tank to said oxygen electrode.

30. A method for operating an electrochemical cell system as in claim 29, further comprising passing said water from said oxygen electrode through an oxygen flow field and a media divider, and to said compartmentalized storage tank.

31. A method for operating an electrochemical cell system as in claim 29, wherein said media divider is porous, electrically conductive, and has a bubble pressure greater than about 0.01 psi.

32. A method for operating an electrochemical cell system as in claim 31, further comprising maintaining a gas/liquid pressure differential of up to said bubble pressure.

33. A method for operating an electrochemical cell system as in claim 29, wherein said movable divider is a bladder, bellows, piston, or diaphragm.

* * * * *

UNITED STATES PATENT AND TRADEMARK OFFICE
CERTIFICATE OF CORRECTION

PATENT NO. : 6,471,850 B2  
APPLICATION NO. : 09/736964  
DATED : October 29, 2002  
INVENTOR(S) : Jason K. Shiepe et al.

It is certified that error appears in the above-identified patent and that said Letters Patent is hereby corrected as shown below:

Column 1:
Line 34, after "flow", delete "of".
Line 61, after "includes", delete "a".

Column 10:
Line 8, after "consisting", insert --of--.
Line 45, after "adjacent to and", insert --in--.
Line 49, after "consisting", insert --of--.

Signed and Sealed this

Eighth Day of May, 2007

JON W. DUDAS  
*Director of the United States Patent and Trademark Office*